United States Patent
Vendel et al.

(10) Patent No.: US 11,045,023 B2
(45) Date of Patent: Jun. 29, 2021

(54) DEVICES AND METHODS OF SUPPORTING AND MOVING DISHES

(71) Applicants: Roman Vendel, Bardejov (SK); Rastislav Vendel, Bardejov (SK)

(72) Inventors: Roman Vendel, Bardejov (SK); Rastislav Vendel, Bardejov (SK)

(*) Notice: Subject to any disclaimer, the term of this patent is extended or adjusted under 35 U.S.C. 154(b) by 299 days.

(21) Appl. No.: 16/247,152

(22) Filed: Jan. 14, 2019

(65) Prior Publication Data
US 2019/0216242 A1    Jul. 18, 2019

Related U.S. Application Data

(60) Provisional application No. 62/617,666, filed on Jan. 16, 2018.

(51) Int. Cl.
*A47G 19/08* (2006.01)
*A47J 45/10* (2006.01)

(52) U.S. Cl.
CPC ............. *A47G 19/08* (2013.01); *A47J 45/10* (2013.01)

(58) Field of Classification Search
CPC .... A47G 19/08; A47G 23/0625; A47G 23/06; A47G 23/0641; A47G 23/0608; A47G 23/065; A47J 45/10; F16B 47/00
USPC ..... 294/15, 16, 27.1, 28, 144, 172; 206/563, 206/557; 220/575, 914, 737, 769, 776; D7/708.1
See application file for complete search history.

(56) References Cited

U.S. PATENT DOCUMENTS

| | | | | |
|---|---|---|---|---|
| 1,264,680 | A * | 4/1918 | Probst | A47J 45/10 294/28 |
| 1,375,268 | A * | 4/1921 | Wittenmyer | A47J 45/10 294/28 |
| 1,588,774 | A * | 6/1926 | Sallac | A47J 45/10 294/28 |
| 1,623,679 | A * | 4/1927 | Hosler | A47J 45/10 294/28 |
| 1,795,260 | A * | 3/1931 | Milldown | A47J 45/10 294/28 |
| 2,916,180 | A * | 12/1959 | Alger | A47G 19/08 220/23.86 |
| D359,885 | S * | 7/1995 | Yanuzzi | D7/549 |
| D560,981 | S * | 2/2008 | Tsui | D7/708.1 |
| D614,926 | S * | 5/2010 | Cox | D7/708 |
| D623,478 | S * | 9/2010 | Hayashi | D7/551.1 |
| 9,839,311 | B2 * | 12/2017 | Shames | A47G 19/065 |

(Continued)

*Primary Examiner* — Paul T Chin
(74) *Attorney, Agent, or Firm* — Hartman Global IP Law; Gary M. Hartman; Domenica N. S. Hartman

(57) ABSTRACT

Devices include a base, and first and second pairs of arms extending from the base in opposite directions along a longitudinal axis of the device. Each of the first and second pairs of arms is spaced apart in a lateral direction of the device. The device further includes a first recess defined by and between the first pair of arms and a second recess defined by and between the second pair of arms to define first and second receptacles, respectively. Each recess has a perimeter exceeding one-half of a circumference of a circle. Accesses to the recesses are disposed on the longitudinal axis of the device and defined between opposing distal ends of the first and second pairs of arms. The first and second pairs of arms define, respectively, first and second sets of handles of the device.

20 Claims, 3 Drawing Sheets

(56) References Cited

U.S. PATENT DOCUMENTS

2010/0230419 A1* 9/2010 Joseph ............... A47G 23/0641
  220/574
2012/0031806 A1* 2/2012 Riley ................. A47G 23/0633
  206/563

* cited by examiner

DEVICES AND METHODS OF SUPPORTING AND MOVING DISHES

CROSS REFERENCE TO RELATED APPLICATIONS

This application claims the benefit of U.S. Provisional Application No. 62/617,666 filed Jan. 16, 2018, the contents of which are incorporated herein by reference.

BACKGROUND OF THE INVENTION

The present invention generally relates to devices and methods of using devices to support, move, place, and retrieve dishes, for example, from an oven.

As used herein, the term "dish" (or "dishes") is used to refer to tableware and dishware used to prepare and/or serve food. Various devices are available for grasping, lifting, and moving dishes, for example, retrieving a hot dish from an oven. Such devices have included utensils adapted to simultaneously engage edges of a dish at multiple locations, or locally grasp one edge of a dish. The former can be difficult to use when removing a dish from an oven or other confined space, and the latter generally involves a one hand operation that, depending on the user, may not offer a desirable level of stability when attempting to move a dish.

There is an ongoing desire for devices that can offer increased stability and safety when supporting and moving dishes, particularly when placing and retrieving dishes from a confined space such as an oven.

BRIEF DESCRIPTION OF THE INVENTION

The present invention provides devices suitable for supporting and moving dishes.

According to one aspect of the invention, such a device includes a base, a first pair of arms extending from the base in a first direction along a longitudinal axis of the device, and a second pair of arms extending from the base along the longitudinal axis of the device in a second direction opposite the first pair of arms. The first pair of arms is spaced apart in a lateral direction of the device and the second pair of arms is spaced apart in the lateral direction of the device. The device further includes a first recess defined by and between the first pair of arms and a second recess defined by and between the second pair of arms to define first and second receptacles, respectively, of the device. Each of the first and second recesses having a perimeter exceeding one-half of a circumference of a circle. First and second accesses to the first and second recesses, respectively, are defined between opposing distal ends of the first and second pairs of arms and are disposed on the longitudinal axis of the device. The first and second pairs of arms define, respectively, first and second sets of handles of the device.

According to another aspect of the invention, methods are provided for supporting and moving a dish supported on a surface. Such a method includes aligning a device with the dish such that a first access to a first recess of the device faces the dish, moving the device toward the dish parallel to the surface supporting the dish so that the dish passes through the first access between distal ends of a first pair of arms of the device and enters the first recess as the first pair of arms pass along on opposite sides of the dish with the result that the first pair of arms are beneath opposite portions of the dish, and then grasping a set of handles defined by a second pair of arms of the device and lifting the device to raise the dish off the surface, wherein the first pair of arms engage the dish such that the dish is settled and stably nested within a first receptacle defined by the first recess.

Preferred aspects of a device as described above include the use of shaped recesses that are configured to engage and support a dish as well as serve as handles for the device to increase stability and safety when supporting and moving dishes.

Other aspects and advantages of this invention will be appreciated from the following detailed description.

DETAILED DESCRIPTION OF THE INVENTION

Figure 1:
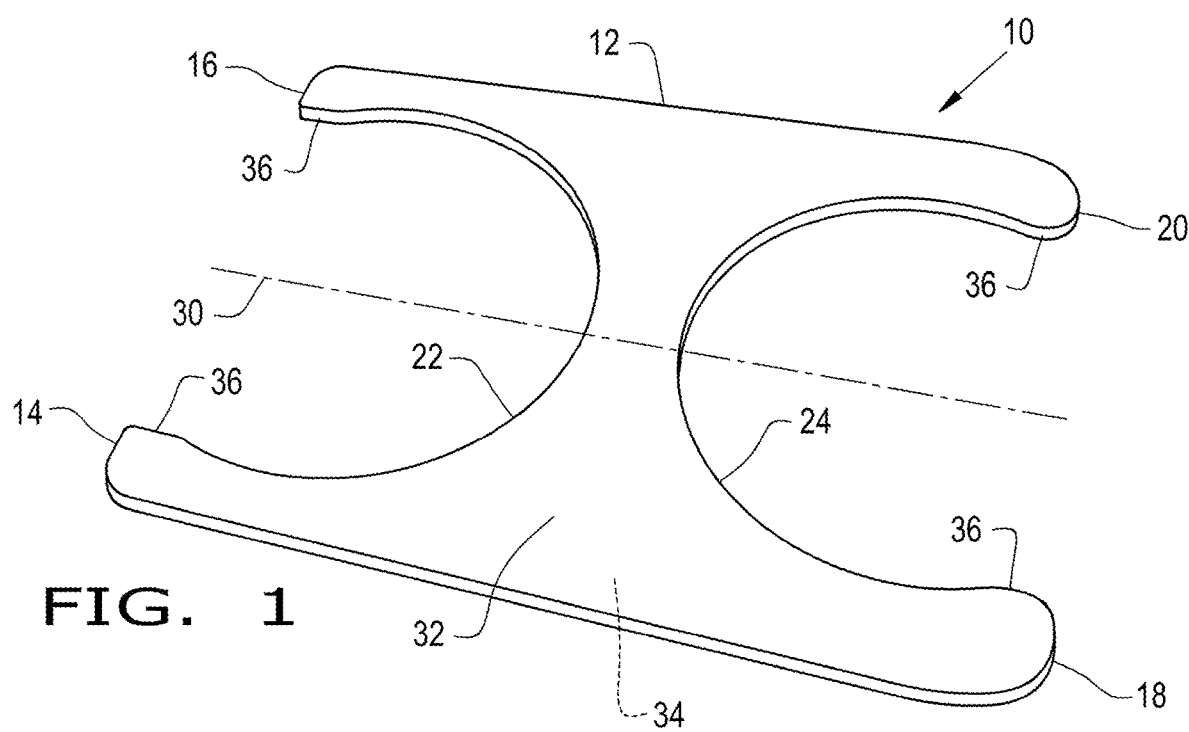
FIGS. 1, 2, and 3 schematically represent perspective, plan, and side views of a device adapted to support, place, and retrieve a dish from a surface in accordance with a nonlimiting embodiment of the present invention.
Figure 2:
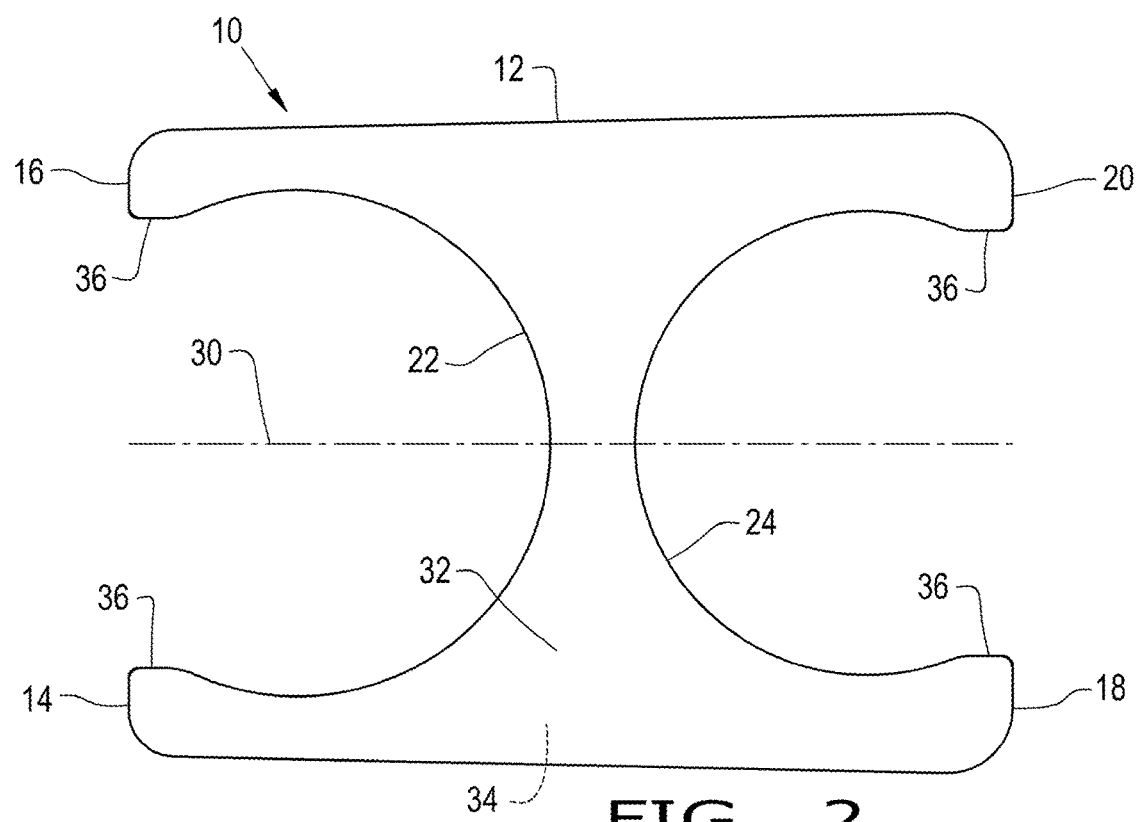
Figure 3:
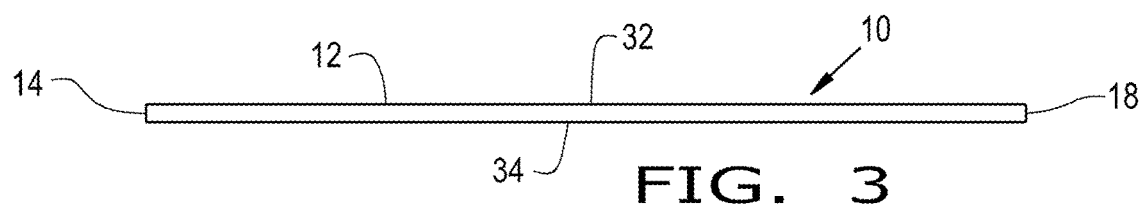

FIGS. 1 through 3 schematically represent a nonlimiting embodiment of a device 10 adapted to support and move, including place and retrieve, a dish relative to a surface in accordance with a nonlimiting embodiment of the present invention. The device 10 provides for a relatively large contact with a dish, generally greater than one-half of the circumference or perimeter of a dish, provides a user with the option to hold the device 10 with both hands, and enables a dish to be easily placed and retrieved from a confined space, such as an oven. As such, a preferred aspect of the device 10 is the capability to increase stability and function when lifting, supporting, and moving a dish, including placing and retrieving a dish, during the preparation and/or serving of food in the dish.

In the nonlimiting embodiment represented in FIGS. 1 through 3, the device 10 is represented as including a base 12 from which pairs of arms 14, 16, 18, and 20 extend in opposite directions along a longitudinal axis 30 of the device 10. The base 12 and its arms 14, 16, 18, and 20 are generally coplanar and define two oppositely-disposed flat surfaces 32 and 34, either of which may be utilized as a top or bottom surface of the device 10 when held in a horizontal position. A first pair of the arms 14 and 16 is spaced laterally apart from each other (i.e., in a direction perpendicular to the longitudinal axis 30), as are the arms 18 and 20 of the second pair. The arms 14 and 18 are also represented as being colinear, as are the arms 16 and 20. Finally, the arms 14, 16, 18, and 20 are represented as roughly parallel to each other and to the longitudinal axis 30 of the device 10, such that each pair of arms 14/16 and 18/20 defines a set of handles by which the device 10 can be readily grasped and oriented in free space. However, in the nonlimiting embodiment represented in FIGS. 1 through 3, the arms 14 and 16 slightly converge toward each other and the arms 18 and 20 slightly diverge from each other by an angle of, for example, about five degrees or less, such that the device 10 has a lateral width at the second pair of arms 18 and 20 that is greater than the lateral width of the device 10 at the first pair of arms 14 and 16. Though the configuration shown in FIGS. 1 through 3 is believed to be preferred, it is not a requirement for using the device 10. However, the illustrated configuration provides for a degree of symmetry and balance.

As a result of their lateral spacing, the arms 14 and 16 define a first recess 22 therebetween and the arms 18 and 20 define a second recess 24 therebetween. In the nonlimiting embodiment of FIGS. 1 through 3, each recess 22 and 24 defines a receptacle having a partial circular shape, and each recess 22 and 24 defines an arcuate perimeter that exceeds one-half of the circumference of their respective circular shapes. Though circular shapes are preferred for the recesses 22 and 24, it is foreseeable that the perimeter of either or both recesses 22 and 24 could have a shape other than circular, including an irregular shape, that is sufficiently congruent to the shape of the perimeter of a dish to enable the dish to be stably supported and nested within the receptacle defined by the recess 22/24.

Each arm 14, 16, 18, and 20 has a distal end that defines a distal edge 36, in which the edges 36 of the arms 14 and 16 oppose each other and the edges 36 of the arms 18 and 20 oppose each other, to define accesses to receptacles defined by the recesses 22 and 24 and through which the body of a dish (or other object) may pass to enter the recesses 22 and 24. As evident from the nonlimiting embodiment represented in FIG. 2, the opposing edges 36 are approximately parallel to each other and to the longitudinal axis 30, and the distance between each pair of opposing edges 36 is less than the lateral width (e.g., diameter) of its corresponding recess 22 or 24, for example, by about ten percent. As also evident from FIG. 2, the circular shape of the recess (receptacle) 22 has a larger diameter (lateral width) than the circular shape of the recess (receptacle) 24, roughly differing by about five percent, to enable the device 10 to accommodate dishes of different diameters. Though the diameters of the recesses 22 and 24 and their sizes relative to each other may vary widely, depending on the types, shapes, and sizes of dishes to be supported within the recesses 22 and 24, generally suitable diameters are believed to be up to about 21 cm, for example, in a range of about 15 cm to about 21 cm.

Due to the slight taper of the device 10 along its longitudinal axis 30, the larger recess 22 is located at the narrower end of the device 10 and the smaller recess 24 is located at the wider end of the device 10. Consequently, each arm 14 and 16 has a smaller lateral width than each arm 18 and 20. Suitable lateral widths for the handles (arms 14, 16, 18 and 20) are generally believed to be up to about 5 cm, for example, in a range of about 2 cm to about 5 cm.

The base 12 and its arms 14, 16, 18, and 20 may have a unitary construction, which may be a homogeneous, composite, or layered construction, and may be formed of the same material. Preferred materials are heat resistant and include, without limitation, wood, plywood, or plastic, including for example acrylonitrile butadiene styrene (ABS). Preferred thicknesses (i.e., perpendicular to the surfaces 32 and 34 of the device 10) will depend on the type of material used to construct the device 10. However, it is believed that particularly suitable thicknesses are generally up to about 10 mm, for example, about 4 mm to about 10 mm.

Figure 5:
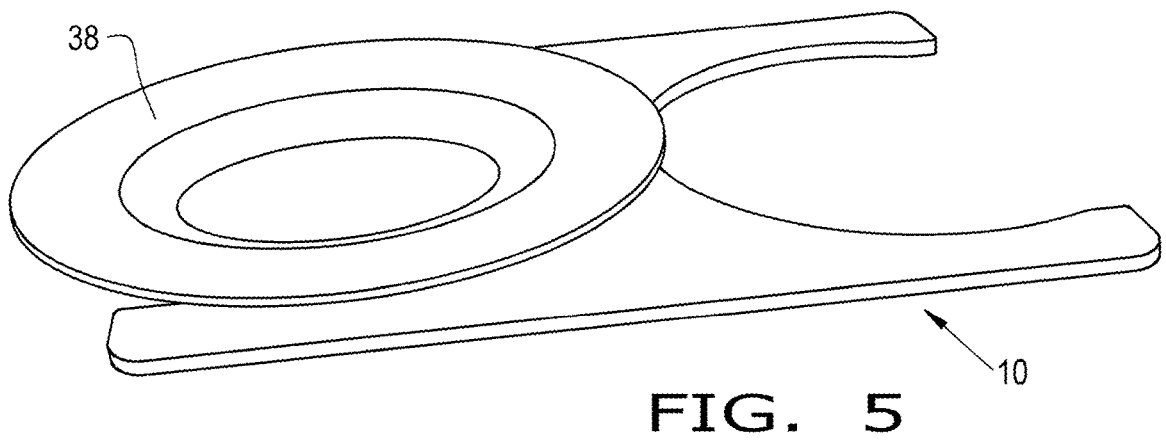
Figure 6:
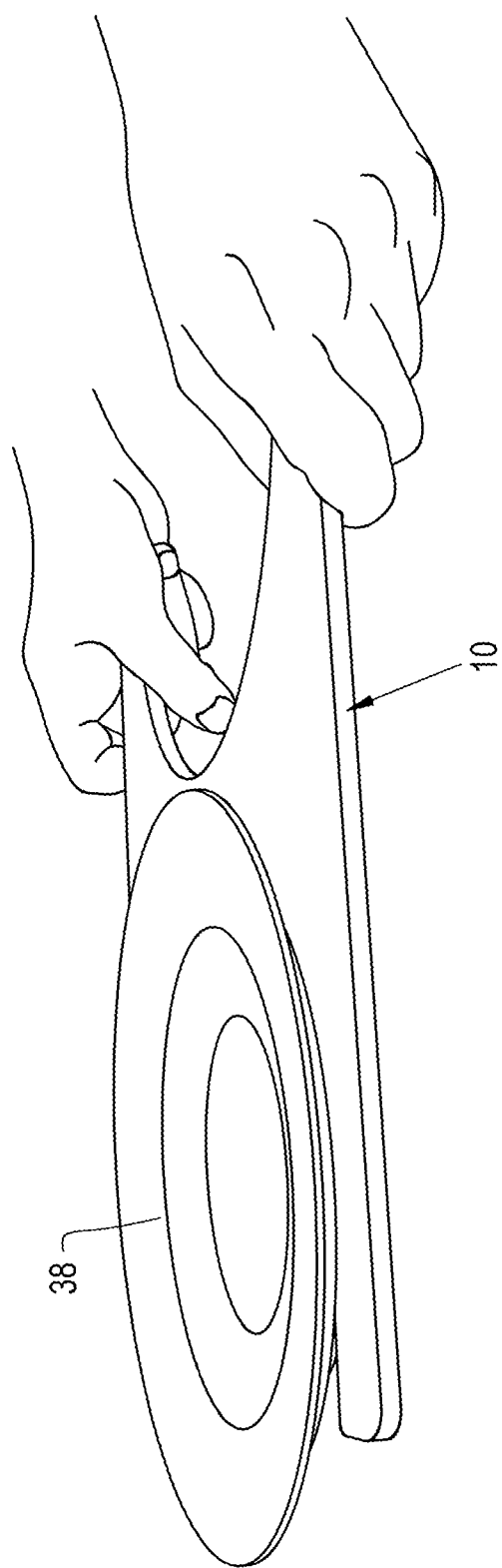

Based on the above description of the nonlimiting embodiment of FIGS. 1 through 3, each pair of arms 14/16 and 18/20 defines a set of handles that is opposite one of the receptacles defined by the opposite recess 22 or 24. Such a configuration provides for methods for supporting and moving a dish, including placing and retrieving a dish, relative to an underlying surface supporting the dish 38, for example, a rack or other surface within an oven. Such a method is depicted in FIGS. 4, 5, and 6 and described below in reference to engaging a dish 38 with the receptacle defined by the recess 22, though the description equally applies to engaging a dish with the receptacle defined by the recess 24.

Figure 4:
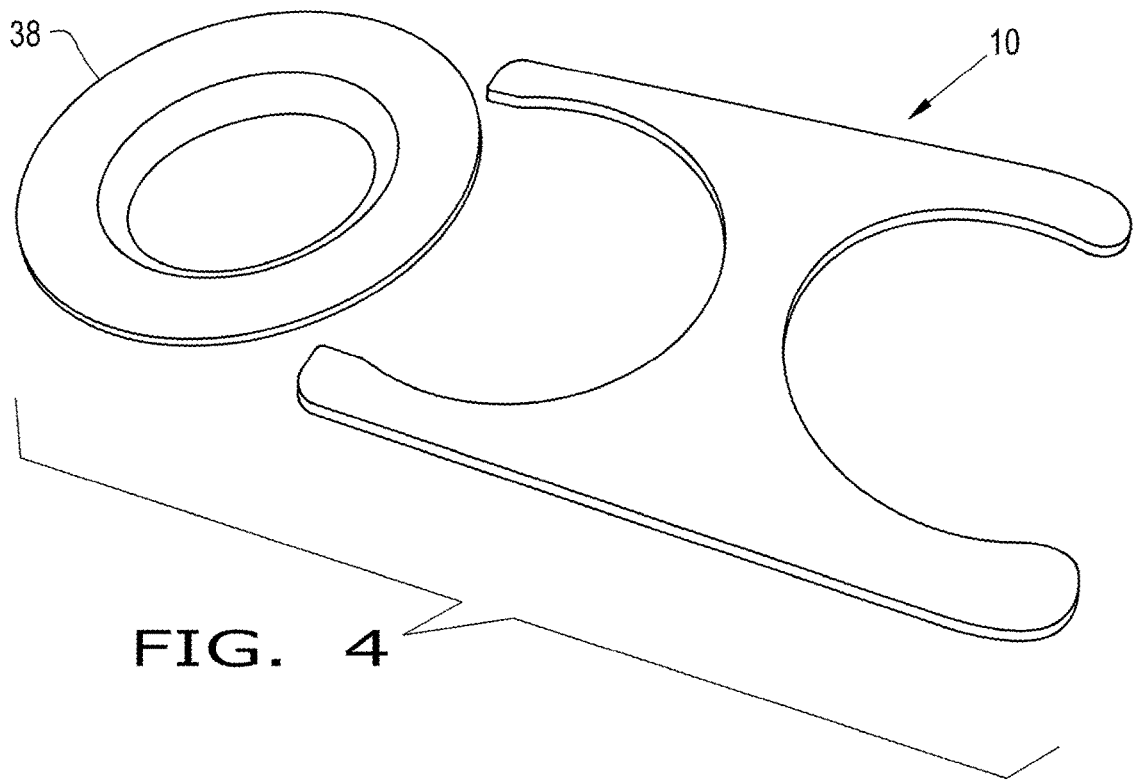
FIGS. 4, 5, and 6 schematically represent methods of using the device of FIGS. 1, 2, and 3.

As represented in FIG. 4, the depicted method generally entails aligning the longitudinal axis 30 of the device 10 with the dish 38 such that the access to the recess 22 (defined by the corresponding pair of arm distal edges 36) faces the dish 38. Thereafter, the device 10 is moved toward the dish 38, generally parallel to the surface supporting the dish 38, so that the dish 38 passes between the distal edges 36 and enters the recess 22 as the arms 14 and 16 pass along on opposite sides of the dish 38, with the result that the arms 14 and 16 are beneath opposite portions of the dish 38, as generally seen in FIG. 5. Finally, FIG. 6 depicts a user grasping the handles defined by the arms 18 and 20 and lifting the device 10 to raise the dish 38 off its underlying support surface. During this step, the arms 14 and 16 engage the dish 38, such that the dish 38 is settled and stably nested within the partial circular shape of the receptacle defined by the arcuate perimeter of the recess 22. Stability of the dish 38 is promoted as a result of the perimeter of the recess 22 being greater than one-half of the circumference of a circular, such that greater than half of the circumference of the dish 38 is engaged by the device 10, and such that the relatively narrow width between the distal edges 36 of the arms 14 and 16 serves as a physical barrier that inhibits the ability of the dish 38 to exit the receptacle. In this condition, the dish 38 can be moved and placed on another surface without the user ever coming in contact with the dish 38. Though represented as being performed with the dish 38 supported on a surface outside of a confined space, it should be apparent that the steps described above can be readily performed while the dish 38 is in a confined space having a single access, such as an oven.

Other aspects and advantages of this invention will be further appreciated from the depictions of the nonlimiting embodiment of the device 10 shown in FIGS. 1 through 6.

While the invention has been described in terms of a particular embodiment, it should be apparent that alternatives could be adopted by one skilled in the art. For example, the device could differ in appearance and construction from the embodiment described herein and shown in the drawings, functions of certain components of the material could be performed by components of different construction but capable of a similar (though not necessarily equivalent) function, and appropriate materials could be substituted for those noted. As such, it should be understood that the above detailed description is intended to describe the particular embodiment represented in the drawings and certain but not necessarily all features and aspects thereof, and to identify certain but not necessarily all alternatives to the represented embodiment and described features and aspects. As a nonlimiting example, the invention encompasses additional or alternative embodiments in which one or more features or aspects of the disclosed embodiment could be eliminated. Accordingly, it should be understood that the invention is not necessarily limited to any embodiment described herein. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. A device for supporting and moving a dish, the device comprising:
   a base;
   a first pair of arms extending from the base in a first direction along a longitudinal axis of the device and a second pair of arms extending from the base along the longitudinal axis of the device in a second direction opposite the first pair of arms, the first pair of arms being spaced apart in a lateral direction of the device and the second pair of arms being spaced apart in the lateral direction of the device;

a first recess defined by and between the first pair of arms and a second recess defined by and between the second pair of arms to define first and second receptacles, respectively, of the device, each of the first and second recesses having a perimeter exceeding one-half of a circumference of a circle; and first and second accesses to the first and second recesses, respectively, the first access being defined between opposing distal ends of the first pair of arms and being disposed on the longitudinal axis of the device, the second access being defined between opposing distal ends of the second pair of arms and being disposed on the longitudinal axis of the device;

wherein the first pair of arms defines a first set of handles of the device and the second pair of arms defines an oppositely-disposed second set of handles of the device.

2. The device according to claim 1, wherein the perimeters of the first and second recesses are arcuate perimeters such that each of the first and second receptacles defines a partial circular shape.

3. The device according to claim 1, wherein the first recess has a lateral width that is greater than a lateral distance between the opposing distal ends of the first pair of arms that define the first access, and the second recess has a lateral width that is greater than a lateral distance between the opposing distal ends of the second pair of arms that define the second access.

4. The device according to claim 1, wherein the first recess has a lateral width that is greater than a lateral width of the first access and the second recess has a lateral width that is greater than a lateral width of the second access.

5. The device according to claim 1, wherein the first recess is larger than the second recess.

6. The device according to claim 5, wherein the first access is wider in the lateral direction than the second access.

7. The device according to claim 5, wherein the device has a lateral width at the second pair of arms that is greater than a lateral width of the device at the first pair of arms.

8. The device according to claim 1, wherein the device has a thickness of up to about 10 mm.

9. The device according to claim 1, wherein the first and second recesses each have a diameter of up to about 21 cm.

10. The device according to claim 1, wherein the base and the first and second pairs of arms are formed of heat resistant materials.

11. A method of using the device of claim 1 to support and move a dish supported on a surface, the method comprising:
    aligning the longitudinal axis of the device with the dish such that the first access to the first recess faces the dish;
    moving the device toward the dish parallel to the surface supporting the dish so that the dish passes through the first access between the distal ends of the first pair of arms and enters the first recess as the first pair of arms pass along on opposite sides of the dish with the result that the first pair of arms are beneath opposite portions of the dish; and
    grasping the second set of handles defined by the second pair of arms and lifting the device to raise the dish off the surface, wherein the first pair of arms engage the dish such that the dish is settled and stably nested within the first receptacle defined by the first recess.

12. The method according to claim 11, wherein greater than half of a circumference of the dish is engaged by the device.

13. The method according to claim 11, wherein the distal ends of the first pair of arms serve as a physical barrier that inhibits the ability of the dish to exit the first receptacle.

14. The method according to claim 11, wherein the surface supporting the dish is within an oven.

15. A method of supporting and moving a dish supported on a surface using a device that has a longitudinal axis and first and second pairs of arms that extend in opposite longitudinal directions from each other, the first pair of arms being spaced laterally apart from each other in first lateral directions perpendicular to the longitudinal axis of the device, the second pair of arms being spaced laterally apart from each other in second lateral directions perpendicular to the longitudinal axis of the device, the first pair of arms defining a first recess and a first access to the first recess, the second pair of arms defining a second recess and a second access to the second recess, the method comprising:
    selecting the first recess of the first pair of arms based on size of the first recess and size of the dish;
    aligning the device with the dish such that the first access to the first recess faces the dish;
    moving the device toward the dish parallel to the surface supporting the dish so that the dish passes through the first access between distal ends of the first pair of arms of the device and enters the first recess as the first pair of arms pass along on opposite sides of the dish with the result that the first pair of arms are beneath opposite portions of the dish; and
    grasping and using the second pair of arms as a set of laterally spaced apart handles to lift the device and to raise the dish off the surface, wherein the first pair of arms engage the dish such that the dish is settled and stably nested within a first receptacle defined by the first recess.

16. The method according to claim 15, wherein as the dish is raised off the surface greater than half of a circumference of the dish is engaged by the first pair of arms of the device.

17. The method according to claim 15, further comprising inhibiting the dish from exiting the first receptacle with the distal ends of the first pair of arms.

18. The method according to claim 15, wherein the surface supporting the dish is within an oven and the method further comprises removing the dish from the oven with the device.

19. The method according to claim 15, wherein the first recess is selected because the first recess is smaller than the second recess.

20. The method according to claim 15, wherein the first recess is selected because the first recess is larger than the second recess.

* * * * *